MAGNETIC AMPLIFIER REVERSIBLE OUTPUT CONVERTER CIRCUIT

Filed Sept. 25, 1962

INVENTOR.
ANTHONY L. NOVAK
BY Kenneth D. Ohm
ATTORNEY

United States Patent Office 3,226,624
Patented Dec. 28, 1965

3,226,624

MAGNETIC AMPLIFIER REVERSIBLE OUTPUT CONVERTER CIRCUIT

Anthony L. Novack, Minneapolis, Minn., assignor to General Mills, Inc., a corporation of Delaware Filed Sept. 25, 1962, Ser. No. 226,139
10 Claims. (Cl. 321—25)

Figures 1, 2:
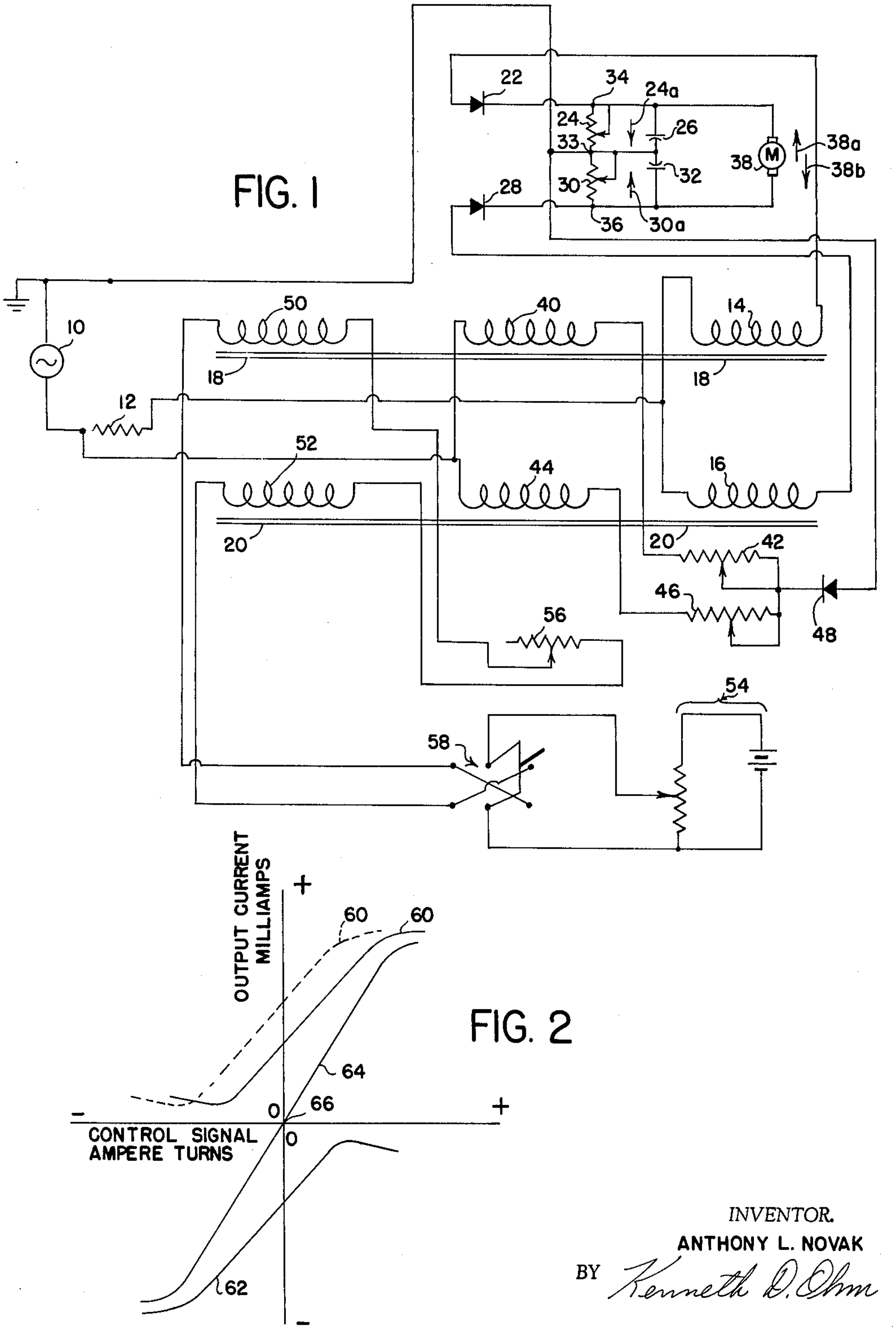

This invention relates to magnetic amplifiers. More particularly, it pertains to the control of the direct current or voltage applied to a load where it is desired to reverse the current flow through said load.

One object of the present invention is to provide a reversible polarity output by use of a half wave magnetic amplifier circuit.

Another object of the present invention is to provide circuitry for precisely balancing the two sides of a push-pull magnetic amplifier output.

A further object of the present invention is to provide a push-pull magnetic amplifier circuit which provides a linear output which is stable.

A still further object of the present invention is to provide circuitry which allows the induced voltages of the bias circuit loops of the two sides of a push-pull magnetic amplifier circuit to buck each other, which at null signal eliminates rectification of the induced current in the bias circuits and which at other than null signal substantially reduces the induced current in the bias circuit.

Other objects and advantages of the invention will be apparent from the following description in which certain preferred embodiments of the invention are disclosed. In the drawings which form a part of this application, FIGURE 1 is a circuit diagram showing one embodiment of the invention; and FIG. 2 is a graph illustrating the effect of bias on the output characteristics of a magnetic amplifier and also the output curves of the present reversible output circuit.

Referring now to FIG. 1, a source of alternating current energy 10 is indicated as supplying current through a resistance 12 to a first output winding 14 and a second output winding 16. The first output winding 14 is wound around a first reactor 18, while the second output winding 16 is wound around a second reactor 20. As used herein, a reactor is a saturable core in which the degree of saturation of the core material may be independently controlled.

The circuit of the first output winding 14 continues through a first rectifier 22 to a first adjustable dummy load resistance 24 connected in shunt with a first capacitance 26. The circuit of the second output winding 16 continues through a second rectifier 28 to a second adjustable dummy load resistance 30 connected in shunt with a second capacitance 32. The first and second dummy load resistances are connected in series with their common point of connection 33 connected to the source of alternating current energy 10, while the free ends 34 and 36 of said resistances are connected in parallel across a reversible variable speed direct current motor or load 38.

Also connected to the source of alternating current energy 10 is a first bias winding 40 in series with a first adjustable bias resistance 42 and a second bias winding 44 in series with a second adjustable bias resistance 46. The first bias winding is wound around the first reactor 18, while the second bias winding is wound around the second reactor 20. The series connection of the first bias winding 40 and first bias resistance 42 is in parallel with the series connection of the second bias winding 44 and second bias resistance 46. The bias circuit continues through a rectifier 48 to the common point of connection 33 of the series connected dummy load resistances 24 and 30.

A first control winding 50 is wound around the first reactor 18 and a second control winding 52 is wound around the second reactor 20. The control windings 50 and 52 are connected in series opposition and are supplied with an adjustable voltage from any source of direct current, for example as shown by numeral 54, through an adjustable control resistance 56. The polarity of the voltage applied to the windings 50 and 52 can be reversed by a reversing switch 58 which is in the circuit of said windings. Variation of the direct current to the winding 50 serves to control the flux of the reactor 18 and thereby control the voltage supplied by the reactor 18 to the load 38, while variation of the direct current to the winding 52 serves to control the flux of the reactor 20 in the opposite direction and thereby control the voltage supplied by the reactor 20 to the load 38.

In operation, the source of alternating current energy 10 causes current to flow through both of the output windings 14 and 16. These currents are rectified by rectifiers 22 and 28, respectively, and thus produce flux in reactors 18 and 20 which does not reverse its direction during each half cycle of the alternating current supply. Since the currents through windings 14 and 16 flow only in one direction, the reactors 18 and 20 tend to be self-saturating, i.e., these currents increase the flux of these reactors toward saturation.

The flux established in the reactors 18 and 20 is effectively reduced by the bias windings 40 and 44. These bias windings 40 and 44 are arranged so the flux produced therein acts in opposition to that of the output windings 14 and 16. This tends to reduce the output currents of windings 14 and 16 and shifts the output characteristic curve 60 from its dotted position (see FIG. 2) to its solid line position.

The flux established in the reactors 18 and 20 by their respective output windings 14 and 16 and their bias windings 40 and 44, respectively, is effectively algebraically added to by the control windings 50 and 52, respectively. That is, the flux is reduced in both reactors by the bias winding current and is increased by the output winding current. The control windings are so connected that they increase the flux in one reactor and decrease the flux in the other when the current therein is increased and vice versa when the control voltage is reversed. The function of these control winding fluxes is to control the degree of saturation of each reactor and thereby control the current delivered through the output windings to the load 38 and the dummy load resistances 24 and 30.

By reference to FIGURE 2, it can be seen that the output voltage across the load 38 is the algebraic sum of the output voltages of the reactor 14, as represented by the voltage across the resistor 24, and the reactor 16, as represented by the voltage across the resistor 30. When the voltage is greater across the resistor 24, current will flow into the load 38 in the downward direction as represented by arrow 38*b*; and when the voltage is greater across the resistor 30 (when the control current is reversed) current will flow in the upward direction as represented by arrow 38*a*.

The output curves of the present magnetic amplifier reversible half wave output circuit are shown in the usual manner for a push-pull amplifier circuit in FIG. 2, with the output of winding 14 depicted by numeral 60 (solid line position), with the output of winding 16 depicted by numeral 62, and with the net output of both windings depicted by numeral 64. With no control voltage applied to the windings 50 and 52, there is no output current through the load 38. This would correspond to point 66 on the resultant output curve 64. With a positive voltage applied to the windings 50 and 52, the flux of reactor 18 increases while the flux of reactor 20 decreases, causing the current output of winding 14 to exceed that of winding 16 and thereby cause a current to flow through the dummy load resistance 24 in the direction of arrow 24*a*, and a current to flow through load 38 in the direction of arrow 38*b*, and through the dummy load resistance 30 in the direction of arrow 30*a*. With a negative voltage applied to the windings 50 and 52, the flux of reactor 18 decreases while the flux of reactor 20 increases, causing the current output of winding 16 to exceed that of winding 14 and thereby cause a current to flow through the dummy load resistance 30 in the direction of arrow 30*a* and a current to flow through the load 38 in the direction of arrow 38*a* and through the dummy load resistance 24 in the direction of arrow 30*a*.

The bias resistors 42 and 46 make possible the precise balancing of the two sides of the push-pull amplifier. When these resistors are adjustable, one can obtain precise balances of the two sides for different loads. The bias resistors 42 and 46 in series with the bias windings 40 and 44, respectively, provide an electrical path so the voltage induced in bias winding 40 bucks the induced voltage in bias winding 44. This is especially important in push-pull circuits where the mode of operation in most applications is critical in the null signal output region. At null the induced voltages cancel each other out and no unwanted induced currents will be rectified by rectifier 48. When the operation is past the null region, there is still a big advantage in the present circuit because the unwanted induced voltage will cancel out and result in a net voltage equal to $E_{40}-E_{44}$ where $E_{40}$ is the induced voltage in the reactor bias winding 40 and $E_{44}$ is the induced voltage in the reactor bias winding 44. When reactor 20 is more saturated than reactor 18, the induced voltage is greater in the reactor 18 than the reactor 20 and conversely.

In view of the principles set forth herein, I have shown some of the ways of carrying out the present invention and some of the equivalents which are suggested by these disclosures.

What is claimed is:

1. A magnetic amplifier reversible output circuit comprising a first reactor, a first output winding on said first reactor adapted to increase the flux of said reactor, a first bias winding on said first reactor adapted to act in opposition to said first output winding to decrease the flux of said first reactor, a first control winding on said first reactor adapted to add algebraically with said first output winding to vary the flux of said first reactor, a second reactor, a second output winding on said second reactor adapted to increase the flux of said second reactor, a second bias winding on said second reactor adapted to act in opposition to said second output winding to decrease the flux of said second reactor, a second control winding on said second reactor adapted to add algebraically with said second output winding to vary the flux of said second reactor, means for varying the current applied to said control windings, a first dummy impedance load, a second dummy impedance load in series with said first dummy impedance load, said series connected impedances connected in series with said output windings and adapted to be connected in parallel with a load, said first and second bias windings being connected in parallel, said parallel connected bias windings connected to the junction point between said dummy impedances, and means for rectifying the current flow between said bias windings and said junction point so said current will flow therebetween in only one direction.

2. A magnetic amplifier reversible output circuit comprising a first reactor, a first output winding on said first reactor adapted to increase the flux of said reactor, a first bias winding on said first reactor adapted to act in opposition to said first output winding to decrease the flux of said first reactor, a first control winding on said first reactor adapted to add algebraically with said first output winding to vary the flux of said first reactor, a second reactor, a second output winding on said second reactor adapted to increase the flux of said second reactor, a second bias winding on said second reactor adapted to act in opposition to said second output winding to decrease the flux of said second reactor, a second control winding on said reactor adapted to add algebraically with said second output winding to vary the flux of said second reactor, means for varying the current applied to said control windings, a first dummy impedance load, a second dummy impedance load in series with said first dummy impedance load, said series connected impedances connected in series with said output windings and adapted to be connected in parallel with a load, said first and second bias windings being connected in parallel, and a rectifier connected between said parallel connected bias windings and the junction point between said dummy impedances.

3. A magnetic amplifier reversible output circuit comprising a first reactor, a first output winding on said first reactor adapted to increase the flux of said reactor, a first bias winding on said first reactor adapted to act in opposition to said first output winding to decrease the flux of said first reactor, a first control winding on said first reactor adapted to add algebraically with said first output winding to vary the flux of said first reactor, a second reactor, a second output winding on said second reactor adapted to increase the flux of said second reactor, a second bias winding on said second reactor adapted to act in opposition to said second output winding to decrease the flux of said second reactor, a second control winding on said reactor adapted to add algebraically with said second output winding to vary the flux of said second reactor, a resistance means adapted to be connected between a source of alternating current and said output windings, means for varying the current applied to said control windings, a first dummy impedance load, a second dummy impedance load in series with said first dummy impedance load, said series connected impedances connected in series with said output windings and adapted to be connected in parallel with a load, said first and second bias windings being connected in parallel, said parallel connected bias windings connected to the junction point between said dummy impedances, and means for rectifying the current flow in said first and second bias windings.

4. A magnetic amplifier reversible output circuit comprising a first reactor, a first output winding on said first reactor adapted to receive current from an alternating current source to increase the flux of said reactor and to deliver current to a load, a first resistor, a first bias winding on said first reactor in series with said first resistor and adapted to act in opposition to said first output winding to decrease the flux of said first reactor, a first control winding on said first reactor adapted to add algebraically with said first output winding to vary the flux of said first reactor, a second reactor, a second output winding on said second reactor adapted to receive current from an alternating current source to increase the flux of said second reactor and to deliver current to the load, a second resistor, a second bias winding on said second reactor in series with said second resistor and adapted to act in opposition to said second output winding to decrease the flux of said second reactor, a second control winding on said second reactor adapted to add algebraically with said second output winding to vary the flux of said second reactor, means for varying the current supplied to said control windings, a first dummy impedance load, a second dummy impedance load in series with said first dummy impedance load, said series connected impedances adapted to be connected in parallel with the load, said first resistor and said first bias winding being connected in parallel with said second resistor and said second bias winding, a rectifier connected between said parallel connected resistor and bias windings and the junction point between said dummy impedances.

5. A magnetic amplifier reversible output circuit as set forth in claim 4 in which at least one of said first and second resistors is adjustable, and at least one of said dummy load impedances is adjustable.

6. A magnetic amplifier reversible output circuit comprising a resistor means, a first reactor, a second reactor, a first output winding on said first reactor adapted to receive current from an alternating current source through said resistor means and to deliver current to a load, a second output winding on said second reactor adapted to receive current from an alternating current source through said resistor means and to deliver current to the load in a reverse direction from that delivered by said first output winding, a first dummy load impedance, a second dummy load impedance in series with said first dummy load impedance, said series connected dummy impedances having their common point of connection adapted to receive current from the alternating current source and also being adapted to be connected in parallel with the load, a first rectifier connected between said first output winding and said first dummy impedance for passing current in one direction through said first dummy impedance, a second rectifier connected between said second output winding and said second dummy impedance for passing current in one direction through said second dummy impedance, a first bias winding on said first reactor adapted to receive current from the alternating current source, a first bias resistance means in series with said first bias winding, a second bias winding on said second reactor adapted to receive current from the alternating current source, a second bias resistance means in series with said second bias winding, said series connection of said first bias winding and said first bias resistance means in parallel with said series connection of said second bias winding and said second bias resistance means, a bias rectifier means for passing current in one direction between said parallel connected bias windings and bias resistance means and said common point of connection of said dummy load impedances, a first control winding on said first reactor, a second control winding on said second reactor in series with said first control winding, and means associated with said control windings for varying the current supplied to said control windings.

7. A magnetic amplifier reversible output circuit comprising an alternating current source, a resistor, a first reactor, a second reactor, a first output winding on said first reactor with one end connected to said current source through said resistor, a second output winding on said second reactor with one end connected to said current source through said resistor, a first dummy load impedance, a second dummy load impedance in series with said first dummy load impedance, said series connected dummy impedances being adapted to be connected in parallel with a load and having their common point of connection wired to said alternating current source, a first rectifier connected between the free end of said first output winding and the free end of said first dummy impedance, a second rectifier connected between the free end of said second output winding and the free end of said second dummy impedance, a first bias winding on said first reactor, a first bias impedance in series with said first bias winding, a second bias winding on said second reactor, a second bias impedance in series with said second bias winding, a bias rectifier, said first and second series connected bias windings and bias impedances being connected in parallel with one end of said parallel connection linked to said alternating current source and with the other end thereof linked to said common point of connection of said dummy load impedances through said bias rectifier, a first control winding on said first reactor, a second control winding on said second reactor in series with said first control winding, and means associated with said control windings for varying the current supplied to said control windings.

8. A magnetic amplifier reversible output circuit comprising an alternating current source, a resistor, a first reactor, a second reactor, a first output winding on said first reactor with one end connected to said current source through said resistor, a second output winding on said second reactor with one end connected to said current source through said resistor, a first dummy load impedance, a second dummy load impedance in series with said first dummy load impedance, said series connected dummy impedances being adapted to be connected in parallel with a load and having their common point of connection wired to said alternating current source, a first rectifier connected between the free end of said first output winding and the free end of said first dummy impedance, a second rectifier connected between the free end of said second output winding and the free end of said second dummy impedance, a first bias winding on said first reactor, a first bias resistance means in series with said first bias winding, a second bias winding on said second reactor, a second bias resistance means in series with said second bias winding, a bias rectifier, said first and second series connected bias windings and bias resistance means being connected in parallel with one end of said parallel connection linked to said alternating current source and with the other end thereof linked to said common point of connection of said dummy load impedances through said bias rectifier, a first control winding on said first reactor, a second control winding on said second reactor in series with said first control winding, a control resistance means in series with said control windings, and an adjustable direct current voltage source in series with said control resistance means and said control windings.

9. A magnetic amplifier reversible output circuit comprising an alternating current source, a resistor, a first reactor, a second reactor, a first output winding on said first reactor with one end connected to said current source through said resistor, a second output winding on said second reactor with one end connected to said current source through said resistor, a first dummy load resistor, a first capacitor shunting said first dummy load resistor, a second dummy load resistor in series with said first dummy load resistor, a second capacitor shunting said second dummy load resistor, said series connected dummy resistors being adapted to be connected in parallel with a load and having their common point of connection wired to said alternating current source, a first rectifier connected between the free end of said first output winding and the free end of said first dummy resistor, a second rectifier connected between the free end of said second output winding and the free end of said second dummy resistor, a first bias winding on said first reactor, a first bias resistor in series with said first bias winding, a second bias winding on said second reactor, a second bias resistor in series with said second bias winding, a bias rectifier, said first and second series connected bias windings and bias resistors being connected in parallel with one end of said parallel connection linked to said alternating current source and with the other end thereof linked to said common point of connection of said dummy load resistors through said bias rectifier, a first control winding on said first reactor, a second control winding on said second reactor in series with said first control winding, a control resistor in series with said control windings, and a reversible adjustable direct current voltage source in series with said control resistor and said control windings.

10. A magnetic amplifier reversible output circuit comprising an alternating current source, a resistor, a first reactor, a second reactor, a first output winding on said first reactor with one end connected to said current source through said resistor, a second output winding on said second reactor with one end connected to said current source through said resistor, a first dummy load adjustable resistor, a first capacitor shunting said first dummy load resistor, a second dummy load adjustable resistor in series with said first dummy load resistor, a second capacitor shunting said second dummy load resistor, said series connected dummy resistors being adapted to be connected in parallel with a load and having their common point of connection wired to said alternating current source, a first rectifier connected between the free end of said first output winding and the free end of said first dummy resistor, a second rectifier connected between the free end of said second output winding and the free end of said second dummy resistor, a first bias winding on said first reactor, a first adjustable bias resistor in series with said first bias winding, a second bias winding on said second reactor, a second adjustable bias resistor in series with said second bias winding, a bias rectifier, said first and second series connected bias windings and bias resistors being connected in parallel with one end of said parallel connection linked to said alternating current source and with the other end thereof linked to said common point of connection of said dummy load resistors through said bias rectifier, a first control winding on said first reactor, a second control winding on said second reactor in series with said first control winding, an adjustable control resistor in series with said control windings, and a reversible adjustable direct current voltage source in series with said adjustable control resistor and said control windings.

References Cited by the Examiner

UNITED STATES PATENTS

| | | | |
|---|---|---|---|
| 2,622,239 | 12/1952 | Bracutt | 321—25 X |
| 2,765,374 | 10/1956 | Louden | 323—89 |
| 2,768,345 | 10/1956 | Ogle et al. | 323—89 |

FOREIGN PATENTS

| | | |
|---|---|---|
| 703,439 | 2/1954 | Great Britain. |
| 717,905 | 11/1954 | Great Britain. |

LLOYD McCOLLUM, *Primary Examiner.*

W. E. RAY, J. M. THOMSON, *Assistant Examiners.*

UNITED STATES PATENT OFFICE

CERTIFICATE OF CORRECTION

Patent No. 3,226,624 December 28, 1965

Anthony L. Novak

It is hereby certified that error appears in the above numbered patent requiring correction and that the said Letters Patent should read as corrected below.

Column 4, lines 10 and 35, after "said", first occurrence, each occurrence, insert -- second --.

Signed and sealed this 25th day of October 1966.

(SEAL)
Attest:

ERNEST W. SWIDER
Attesting Officer

EDWARD J. BRENNER
Commissioner of Patents